(12) United States Patent
Mask

(10) Patent No.: US 12,507,803 B2
(45) Date of Patent: Dec. 30, 2025

(54) DESK PAD WITH BASE AND REMOVABLE CLOTH TOP

(71) Applicant: Grady Mask, Bristol, VA (US)

(72) Inventor: Grady Mask, Bristol, VA (US)

(*) Notice: Subject to any disclaimer, the term of this patent is extended or adjusted under 35 U.S.C. 154(b) by 90 days.

(21) Appl. No.: 18/162,975

(22) Filed: Feb. 1, 2023

(65) Prior Publication Data
US 2024/0251948 A1 Aug. 1, 2024

(51) Int. Cl.
| | |
|---|---|
| A47B 96/20 | (2006.01) |
| A47B 96/18 | (2006.01) |
| B32B 3/30 | (2006.01) |
| B32B 5/02 | (2006.01) |
| B32B 7/02 | (2019.01) |
| B32B 7/06 | (2019.01) |
| B32B 15/14 | (2006.01) |
| B32B 15/18 | (2006.01) |
| B32B 15/20 | (2006.01) |
| B32B 27/12 | (2006.01) |
| B32B 27/30 | (2006.01) |
| B32B 27/32 | (2006.01) |
| B32B 27/36 | (2006.01) |

(52) U.S. Cl.
CPC ............ *A47B 96/206* (2013.01); *A47B 96/18* (2013.01); *B32B 3/30* (2013.01); *B32B 5/02* (2013.01); *B32B 7/02* (2013.01); *B32B 7/06* (2013.01); *B32B 15/14* (2013.01); *B32B 15/18* (2013.01); *B32B 15/20* (2013.01); *B32B 27/12* (2013.01); *B32B 27/302* (2013.01); *B32B 27/304* (2013.01); *B32B 27/32* (2013.01); *B32B 27/36* (2013.01); *A47B 2200/0095* (2013.01); *B32B 2262/062* (2013.01); *B32B 2262/08* (2013.01); *B32B 2307/412* (2013.01); *B32B 2307/744* (2013.01); *B32B 2307/748* (2013.01)

(58) Field of Classification Search
CPC ............ A47B 96/206; B32B 3/30; B32B 5/02
See application file for complete search history.

(56) References Cited

U.S. PATENT DOCUMENTS

| | | | | |
|---|---|---|---|---|
| 4,737,308 | A * | 4/1988 | Pearson | C11D 7/268 510/276 |
| 5,562,270 | A * | 10/1996 | Montague | G06F 3/0395 248/118.1 |
| 6,471,164 | B2 | 10/2002 | DiOrio | |
| 6,989,814 | B1 * | 1/2006 | Mattson | G06F 3/0395 D14/402 |
| 7,175,310 | B1 | 2/2007 | Cotterell | |
| 8,408,779 | B2 | 4/2013 | Jamie | |
| 10,216,298 | B2 | 2/2019 | Chou | |
| 10,365,422 | B2 | 7/2019 | Hong et al. | |
| 10,488,956 | B2 | 11/2019 | Chou | |

(Continued)

*Primary Examiner* — Anne M Hines
(74) *Attorney, Agent, or Firm* — Sheri Higgins Law, PLLC; Sheri Higgins

(57) ABSTRACT

A desk pad can include a base and a removable, fabric top. The top can be removed from the base and washed or switched with a different top. The base can include at least two layers with one layer having a slip-resistant material for placement onto a desk and another layer housing a plurality of lights around the perimeter. The layer housing the lights can be made from a transparent or opaque material. The base can also include a control unit having a connection socket for connecting the desk pad to a computer or power source.

19 Claims, 3 Drawing Sheets

(56) References Cited

U.S. PATENT DOCUMENTS

| | | | |
|---|---|---|---|
| 10,782,008 B1 | 9/2020 | Lu et al. | |
| 10,859,750 B1 | 12/2020 | Lai | |
| 11,500,483 B2 | 11/2022 | Choi | |
| 2002/0062667 A1* | 5/2002 | Ahmad | D06F 35/00 68/12.12 |
| 2003/0034054 A1* | 2/2003 | Lee | F16D 11/12 68/12.24 |
| 2013/0058129 A1* | 3/2013 | Limber | G06F 3/0395 362/605 |
| 2019/0113669 A1* | 4/2019 | Hong | G06F 3/039 |
| 2019/0302906 A1* | 10/2019 | Chou | G06F 3/0395 |
| 2021/0219734 A1* | 7/2021 | Blackowiak | A47C 27/142 |
| 2023/0168715 A1* | 6/2023 | Popescu | G06F 3/03543 345/163 |

* cited by examiner

DESK PAD WITH BASE AND REMOVABLE CLOTH TOP

TECHNICAL FIELD

The field relates to a desk pad for placing on a desk. The desk pad has a removable, fabric top that is removably attached to a base. The base can include lights and a control unit.

BRIEF DESCRIPTION OF THE FIGURES

The features and advantages of the embodiments will be more readily appreciated when considered in conjunction with the accompanying figures. The figures are not to be construed as limiting any of the embodiments.

DETAILED DESCRIPTION

Desk pads are commonly placed on a desk so a person can place a computer keyboard or mouse or other electronic equipment onto the desk pad. The desk pad protects the desk from scratches. As used herein, the term "desk pad" refers to any type of protective pad that is placed on a desk regardless of the size of the pad. For example, smaller desk pads are commonly referred to as a mouse pad. As used herein, a "desk pad" also includes mouse pads without the need to refer to both throughout.

A desk pad can include a base, which can be made of more than one layer of material and a top layer. Desk pads can be hard or soft. The top, or cover, is typically made from a variety of materials, such as natural rubber, fabrics, or plastics. Hard desk pads generally include a plastic top; while soft desk pads generally include a non-rigid top, for example, rubber or fabrics. It is not uncommon for desk pads to get dusty. Moreover, a person can spill drinks, such as coffee, or get food on a desk pad. For a hard desk pad, cleaning can be accomplished by wiping the plastic surface. However, for soft desk pads, dirt, drinks, and food can penetrate into the fabric, and cleaning may not be possible because the desk pad cannot be handwashed or washed in a washing machine. Thus, there is a long-felt need for a fabric-topped desk pad that can be thoroughly cleaned.

Fabric topped desk pads can also include graphics. The graphics can be, for example, a logo, a photograph, or holiday themed. However, if a person desires to change the graphic, then a new, complete desk pad has to be purchased or switched for the current pad. Not only does a complete, new desk pad cost more money, but storage space is needed to store the desk pads that are not currently being used. Thus, there is also a need to solve the aforementioned problems.

It has been discovered that a desk pad can include a removable, fabric top. The removable, fabric top can be removably attached to a base. The removable, fabric top can be removed from the base and washed. Additionally, the removable, fabric top can be switched out with a removable, fabric top that has a different graphic without the need to replace the entire desk pad.

A desk pad can include a base, wherein the base comprises a first and second layer; and a fabric top that is removably attached to a top side of the base.

Figure 1:
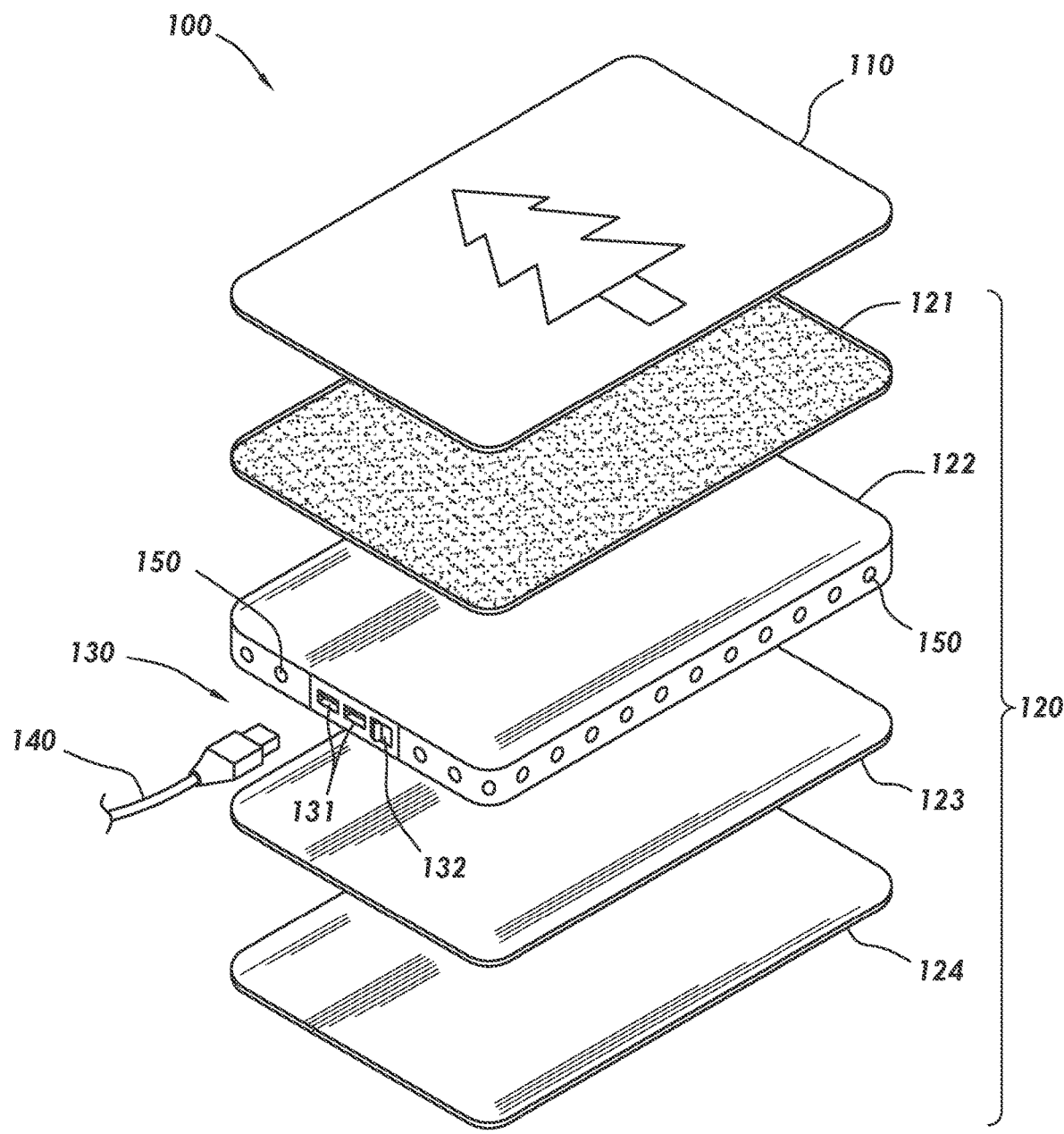
FIG. 1 is an exploded perspective view of a desk pad with multiple base layers according to certain embodiments.

Turning to the figures, FIG. 1 is an exploded perspective view of a desk pad 100. The desk pad 100 includes a base 120. The base 120 can include two or more layers. By way of example, the base 120 can include a first layer 121, a second layer 122, a third layer 123, a fourth layer 124, etc. The base 120 can only include two layers, for example, the second layer 122 and the third layer 123. It is to be understood that the discussion of any one of the base layers can be applicable to any of the other layers. By way of example, if the base 120 only includes two layers, then any discussion regarding the second layer 122 can be applicable to the first layer 121 or the discussion regarding the fourth layer 124 can be applicable to the second layer 122. In other words, any numbering of the layers can be omitted or switched with another layer number without departing from the various embodiments discussed.

According to any of the embodiments, at least one layer of the base 120 is made from a semi-rigid or rigid material. Examples of semi-rigid and rigid materials include but are not limited to polymeric plastics, metals, or metal alloys. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin. As used herein, the term "metal" and all grammatical variations thereof means any substance that comprises a metal, which includes pure metals and metal alloys.

Examples of semi-rigid or rigid polymeric plastics include but are not limited to low-density polyethylene (LDPE), high-density polyethylene (HDPE), polyethylene terephthalate (PET or PETE), polyvinyl chloride (PVC), polypropylene (PP), polystyrene (PS), high-impact polystyrene (HIPS), acrylonitrile butadiene styrene (ABS), cellulose-acetate-butyrate (Cab), or polyvinylidene fluoride or polyvinylidene difluoride (PVDF). The polymeric plastic can be transparent or opaque.

Examples of metals include but are not limited to iron, aluminum, steel, carbon steel, stainless steel, zinc, lead, copper, tin, brass, nickel, and chromium. If the base 120 includes more than two layers, then each layer can be made from a different type of material. By way of example, the first layer 121 can be made from an opaque material, the second layer 122 can be made from a transparent material, and the third layer 123 can be made from an opaque material. According to any of the embodiments, if more than two layers are included in the base 120, then the materials for each layer can be selected such that the layers are capable of being permanently affixed to each other. In this manner, the base 120 can be considered a single unit. Examples of ways to affix the layers together can include welding, spot welding, an adhesive, or for thermoplastics, fusing the layer interfaces via melting and then cooling.

The bottommost layer of the base 120 (shown as the fourth layer 124 in FIG. 1) can be made from a slip-resistant material, such as rubber. The bottommost layer is configured to be placed directly onto a desk's surface. In this manner, movement of the desk pad 100 on the desk is substantially inhibited or prevented. Although shown in FIG. 1 as including four layers, as mentioned above, the base 120 can include only two layers or only three layers. Accordingly, the bottommost layer can be the second layer 122 or the third layer 123. The layers making up the base 120 can also have the same or different thicknesses. By way of example, the bottommost layer can have a thickness that is less than the thickness of any of the other base layers.

The desk pad 100 can have a variety of dimensions. According to any of the embodiments, all of the layers making up the base 120 have the same dimensions. An example of the second layer 122 shown in FIG. 2 has a width W and a depth D. According to other embodiments, any of the layers can have different dimensions. For example, the bottommost layer of the base, which is shown as the fourth layer 124, or the layer of the base that houses the plurality of lights 150, which is shown as the second layer 122, can have smaller dimensions than the other layers. The removable, fabric top 110 can have the same dimensions or different dimensions than the base 120. The desk pad 100 can be a variety of shapes such as triangular, square, circular, oval, or rectangular. The desk pad 100 can have a width in the range of 3 to 90 inches; a depth in the range of 3 to 90 inches; a circumference in the range of 3 to 90 inches; or a perimeter in the range of 3 to 90 inches.

The desk pad 100 also includes a removable, fabric top 110. The removable, fabric top 110 is removably attached to a top side of the base, which is discussed in more detail below. The top side of the base can be a top side of the base 120 layer located adjacent to a bottom side of the removable, fabric top 110. By way of example and as shown in FIG. 1, the removable, fabric top 110 can be removably attached to the top side of the first layer 121.

The removable, fabric top 110 can include a graphic (shown in FIG. 1 as a tree). The graphic can be located on all or just a portion of a top side of the removable, fabric top 110. As used herein, the term "top side" means the planar surface of any of the layers that are the farthest from a desk's surface when the desk pad is placed on the desk. The removable, fabric top 110 can include a layer of fabric overlayed and attached to a different layer of material, such as a flexible foam material. The fabric or cloth fibers making up the fabric can be selected from cotton, cotton blends, linen, velvet, chenille, chiffon, damask, jersey, satin, or silk, for example. According to any of the embodiments, all of the materials making up the removable, fabric top 110 are selected from hand- or machine-washable materials. In this advantageous manner, the removable, fabric top 110 can be removed from the base 120 and washed to remove dirt or other substances such as drinks or food that may have been spilled on the desk pad 100. Another important advantage to the removable, fabric top 110 is that the tops are interchangeable, and a person can use the same base 120 and remove one fabric top and replace it with a different fabric top.

The desk pad 100 can further include other components. A plurality of lights 150 can be located around a perimeter of at least one of the layers making up the base 120 (shown in the drawings as being located around the perimeter of the second layer 122). It is to be understood that the plurality of lights 150 can be located around the perimeter of any of the other layers for the base besides the second layer 122 (e.g., the first layer 121 or the third layer 123) except preferably not around the perimeter of the bottommost layer, which is preferably made from a slip-resistant material. The plurality of lights 150 can be for example, light-emitting diode (LED), incandescent, compact fluorescent, halogen, metal halide, fluorescent, neon, or high-intensity-discharge lamps.

Each side of the perimeter of the second layer 122 can include a desired number and spacing pattern of the lamps making up the plurality of lights 150. The number and spacing pattern of the lamps can be the same or different for each side. By way of example, if the base 120 is rectangular in shape, then the longest sides may include more lamps than the shorter sides. Some or all of the lamps making up the plurality of lights 150 can emit white light or colored light. The colored light can be the same or different. By way of a first example, all of the lamps can emit one color of light (e.g., green light) at the same time. The desk pad 100 can be configured such that the one color of light changes automatically or manually to a different color of light (e.g., from green to purple). There can also be a multitude of different colors that the light changes to. The plurality of lights 150 can also be configured to emit continual light, to flash, brighten and dim, or to pulse at a variety of frequencies. Any changes in the color of light emitted, flashing, dimming, brightening, or pulsing can be controlled via computer software.

By way of a second example, some of the lamps can emit one color of light, some of the lamps can emit a different color of light, while others can emit yet a different color of light. For example, the plurality of lights 150 of a first side of the perimeter can emit green light, a second side of the perimeter can emit red light, a third side of the perimeter can emit orange light, and a fourth side of the perimeter can emit blue light. Alternatively, the plurality of lights 150 of a given side of the perimeter can emit different colored light in an alternating pattern (e.g., green, blue, red, green, blue, red, etc.). The plurality of lights 150 according to this second example can also be configured to change colors at different time intervals.

Figure 2:
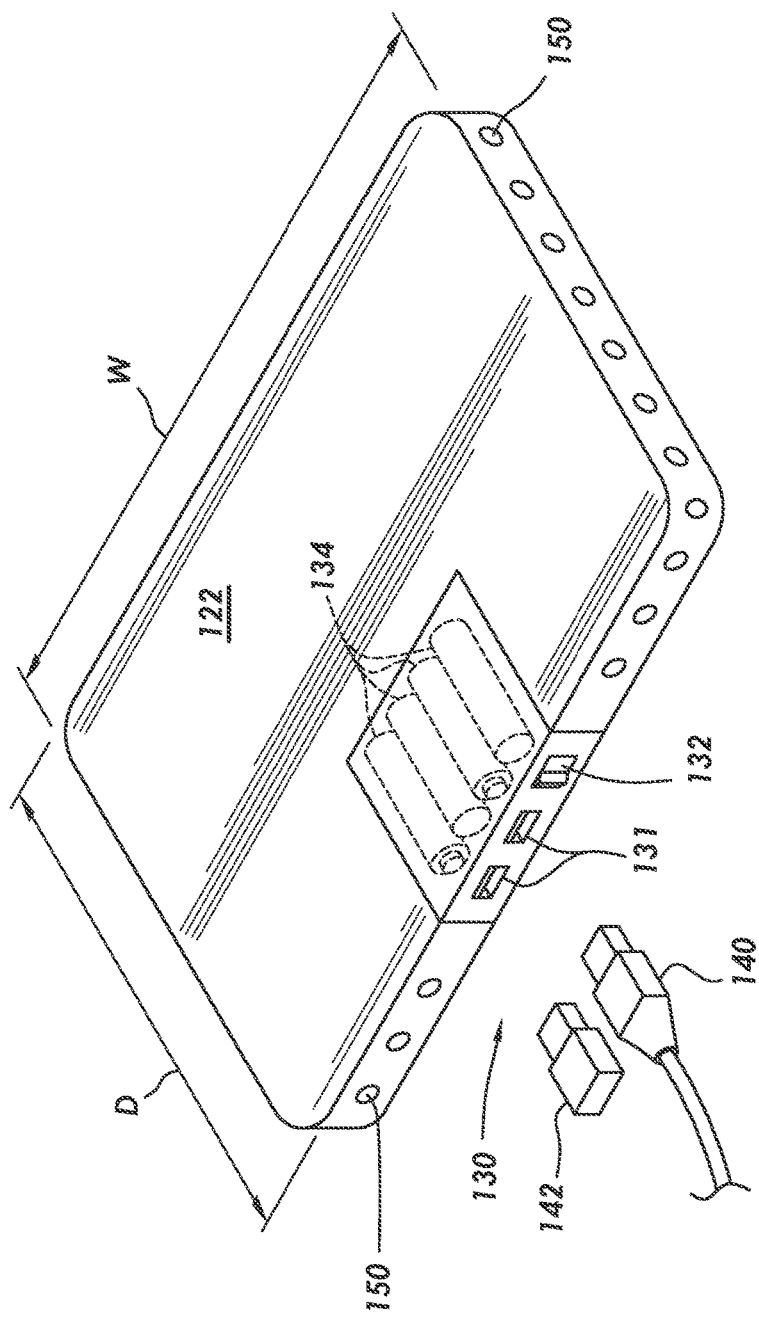
FIG. 2 is a top perspective view of the desk pad showing a control unit and lights around a perimeter of a base layer according to certain embodiments.

As can be seen in FIGS. 1 and 2, the desk pad 100 can further include a control unit 130. The control unit 130 can be positioned along a side of the layer that houses the plurality of lights 150, as shown in the drawings for example as being located along a left side of the second layer 122 in FIG. 1 and located along a back side of the second layer 122 in FIG. 2. According to any of the embodiments, the control unit 130 is not located at a front side (i.e., the side that would face a user) of the base layer that houses the plurality of lights 150.

The control unit 130 can contain one or more connection sockets 131 that are electrically coupled to the control unit 130. The one or more connection sockets 131 can be an USB (universal serial bus) connection for connecting a keyboard, mouse, or other computer or gaming devices to a computer or gaming system via a corresponding USB cable 140. The USB connection can be any USB connector such as, Micro USB-B, USB-A, or USB-C. Instead of, or in addition to, the USB cable 140, a wireless USB-plug transmitter 142 can be used to establish a wireless connection of the desk pad 100 to an associated transmitter plugged into a USB socket of the computer.

The USB connection can also be used to power the plurality of lights 150 by supplying power from the computer to the plurality of lights 150. According to other embodiments, the control unit 130 can include a self-contained power supply such as batteries 134 that are used to power the plurality of lights 150. The batteries 134 can be rechargeable batteries. Rechargeable batteries can be recharged via connection to a power source via the USB cable 140 that is inserted into a corresponding connection socket 131. The control unit 130 can also include a power switch 132 for supplying or cutting power to the plurality of lights 150. The power switch 132 can be for example a push button switch, a toggle switch, or a slide switch. The control unit 130 can also include a light color switch (not shown). The light color switch can be used to manually change the color of light being emitted from the plurality of lights 150 or to switch from a continual light output to a pulsing or flashing light output and vice versa.

Figure 3A:
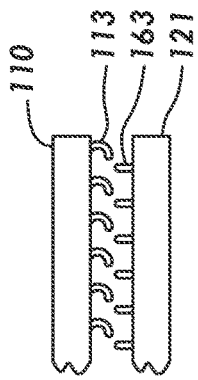
FIGS. 3A-3C are front, cross-sectional views of different ways of removably attaching a removable fabric top to a base layer according to various embodiments.

The removable, fabric top 110 can be removably attached to the top side of the base 120 in a variety of ways. By way of a first example as shown in FIG. 3A, a bottom side of the removable, fabric top 110 can include a plurality of tiny loops 111. A top side of the base layer located at the top of the base 120 (shown as the first layer 121) can include a plurality of tiny flexible hooks 161. The plurality of tiny loops and tiny flexible hooks are commonly known by the tradename VELCRO®. When pressed together, the tiny loops adhere to the tiny flexible hooks and create a removable attachment. The plurality of tiny loops and tiny flexible hooks can be permanently attached to the bottom side and top side, for example, via an adhesive.

Figure 3B:
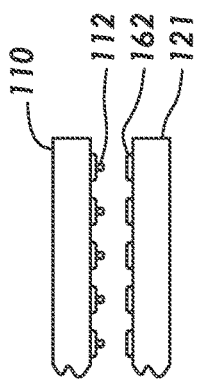

By way of a second example as shown in FIG. 3B, a bottom side of the removable, fabric top 110 can include a plurality of snap caps and studs 112. A top side of the base layer located at the top of the base 120 (shown as the first layer 121) can include a plurality of snap sockets 162. When the snap studs are aligned with the snap sockets and pressed together, the snaps create a removable attachment. To remove the removable, fabric top 110, a person can lift up on the fabric top to release the snap studs with a mating engagement with the snap sockets. The plurality of snap caps and studs 112 can be permanently attached to the bottom side of the removable, fabric top 110 via an adhesive or stitches. The plurality of snap sockets 162 can be permanently attached to the top side of the base layer during fabrication of the base layer, such as injection molding for plastics, or attached after the fabrication process, such as welding or spot welding for metals. Accordingly, the snaps can be made from plastics or metals.

Figure 3C:
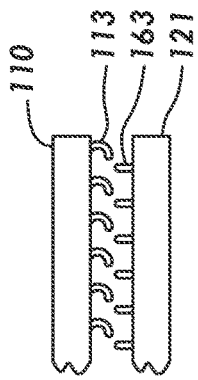

By way of a third example as shown in FIG. 3C, a bottom side of the removable, fabric top 110 can include a plurality of hooks 113. A top side of the base layer located at the top of the base 120 (shown as the first layer 121) can include a plurality of tiny eyes 163. When the mating end of the plurality of hooks 113 are lined up with an opening of the plurality of tiny eyes 163, the mating ends can fit within the openings and create a removable attachment. To remove the removable, fabric top 110, a person can lift up and sideways on the fabric top to release the hooks from engagement with the eyes. The plurality of hooks 113 can be permanently attached to the bottom side of the removable, fabric top 110 via an adhesive or stitches. The plurality of tiny eyes 163 can be permanently attached to the top side of the base layer during fabrication of the base layer, such as injection molding for plastics, or attached after the fabrication process, such as welding or spot welding for metals. Accordingly, the hooks and eyes can be made from plastics or metals.

By way of a fourth example, the removable, fabric top 110 can be removably attached to the top side of the base 120 via a reusable adhesive. The reusable adhesive can be a tape, putty, glue, gel, or other substances. By way of a fifth example, the removable, fabric top can include a strip of material (not shown), such as elastic, that spans across an underneath side of the top in each corner. The strips of material can be hooked around a corresponding corner of at least one layer of the base, for example, the first layer, to secure the top to the base similar to elastic at each corner of a fitted sheet for placement onto a mattress. By way of a sixth example, the base can include an inner ring (not shown) that is configured to fit snugly within a raised perimeter of the first layer of the base. The inner ring does not have to be circular in shape but is intended to match the shape of the first layer (e.g., rectangular, square, etc.) and have slightly smaller dimensions than the perimeter of the first layer. The edges of the fabric top can be positioned around the outside of the inner ring, pulled taut, and then the inner ring with the fabric top can be inserted into the slightly larger raised perimeter of the first layer to attach the fabric top to the base similar to an embroidery hoop.

Figure 4A:
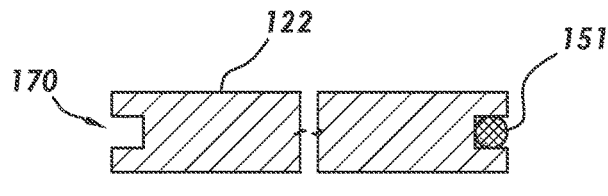
FIGS. 4A and 4B are front, cross-sectional views of a channel for receiving lights according to certain embodiments.
Figure 4B:
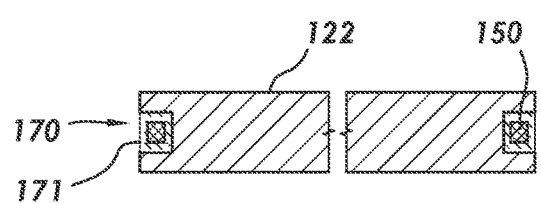

FIGS. 4A and 4B are front views of the base 120 layer that houses the plurality of lights 150 (shown as being the second layer 122) cross-sectionally taken along a width of the desk pad 100. The second layer 122 can include a channel 170 that spans partially or wholly around the perimeter of the second layer 122. The plurality of lights 150 can be located within the channel 170. The embodiments shown in FIGS. 4A and 4B can be used when the material for the second layer 122 is opaque. By contrast, for transparent materials, the plurality of lights can be embedded directly into the transparent material such that the light emitted is visible. As shown in FIG. 4A, the channel 170 can have an opening, and the plurality of lights can be in the form of a rope light 151. The rope light 151 can be placed within the channel 170 via the opening. The rope light 151 can be a transparent, cylindrical housing for individual lamps. Instead of an opening, the channel 170 can further include a transparent portion. This embodiment can be useful when individual lamps are electrically connected in series and are not rope lights. In this manner, the plurality of lights 150 are housed and contained within the channel 170. The dimensions of the channel 170 can be selected such that the rope light 151 or the plurality of lights 150 fit within and are contained within the channel 170.

Figure 5:
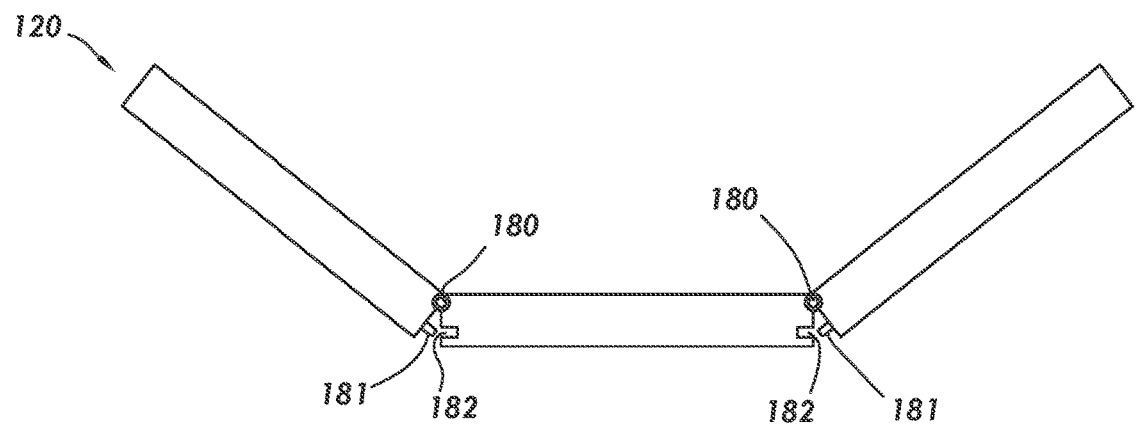
FIG. 5 is a front view of the desk pad showing hinges according to certain embodiments.

As shown in FIG. 5, the base 120 can include one or more break points and hinges 180. The one or more break points and hinges 180 can be used to decrease the width and/or depth of the base 120, for example for shipping or storage, by allowing portions of the base to be folded. The base 120 can also include corresponding interlocking tabs 181 and interlocking slots 182. Although not shown, the interlocking tabs 181 and the interlocking slots 182 can include electrical connections for the plurality of lights 150. According to any of the embodiments, interlocking tabs 181 and interlocking slots 182 that include electrical connections are preferably located in the base layer that houses the plurality of lights 150, for example, the second layer 122. In practice, a release button can be activated to release the interlocking tabs 181 from engagement with the interlocking slots 182. The sides of the base 120 located adjacent to the hinge(s) 180 can be moved in an upward direction until the sides are folded on top of the middle or each other. For use, the sides can be moved out of the folded position, the interlocking tabs 181 can be aligned with the interlocking slots 182 (if included), and the base 120 can be flattened out. The removable, fabric top 110 can then be attached to the top side of the base 120.

Figure 6:
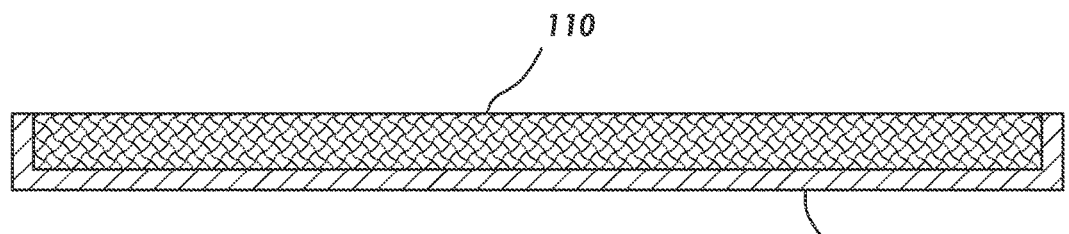
FIG. 6 is a front, cross-sectional view showing the removable fabric top being removably attached within a perimeter of a base layer according to certain embodiments.

The perimeter of the removable, fabric top 110 can be flush with the perimeter of the base 120, for example as shown in FIGS. 3A-3C. According to other embodiments, the perimeter of the removable, fabric top 110 can be less than the perimeter of the topmost layer of the base, for example as shown in FIG. 6 as the first layer 121. Accordingly, the removable, fabric top 110 can fit within the topmost layer of the base 120.

Therefore, the apparatus, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While the apparatus, systems, and methods are described in terms of "comprising," "containing," or "including" various components or steps, the apparatus, systems, and methods also can "consist essentially of" or "consist of" the various components and steps. It should also be understood that, as used herein, "first," "second," and "third," are assigned arbitrarily and are merely intended to differentiate between two or more layers, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A desk pad comprising:
   a base, wherein the base comprises a first layer and a second layer, wherein the base has a perimeter defined by 4 sides;
   a plurality of lamps that emit light, wherein the plurality of lamps partially or wholly span a length of at least one of the 4 sides of the perimeter of the first layer; and
   a fabric top that is removably attached to a top side of the base, wherein a bottom side of the fabric top comprises a plurality of tiny loops, wherein a top side of the first layer comprises a plurality of tiny flexible hooks, and wherein the fabric top is configured to be removably attached to the top side of the first layer via the plurality of tiny loops and the plurality of tiny flexible hooks.

2. The desk pad according to claim 1, wherein the first layer is made from a semi-rigid or rigid material.

3. The desk pad according to claim 2, wherein the material is selected from polymeric plastics, metals, or metal alloys.

4. The desk pad according to claim 3, wherein the polymeric plastic is selected from low-density polyethylene, high-density polyethylene, polyethylene terephthalate, polyvinyl chloride, polypropylene, polystyrene, high-impact polystyrene, acrylonitrile butadiene styrene, cellulose-acetate-butyrate, polyvinylidene fluoride, or polyvinylidene difluoride.

5. The desk pad according to claim 3, wherein the metal or metal alloy is selected from iron, aluminum, steel, carbon steel, stainless steel, zinc, lead, copper, tin, brass, nickel, or chromium.

6. The desk pad according to claim 1, wherein the second layer is made from a slip-resistant material, and wherein the second layer is configured to be placed directly onto a desk's surface.

7. The desk pad according to claim 1, wherein the first layer and the second layer have different thicknesses.

8. The desk pad according to claim 1, wherein the desk pad has a shape selected from square or rectangular.

9. The desk pad according to claim 8, wherein the desk pad has a width in the range of 3 to 90 inches and a depth in the range of 3 to 90 inches.

10. The desk pad according to claim 1, wherein the fabric top is made from a hand- or machine-washable material.

11. The desk pad according to claim 10, wherein the material is selected from the group consisting of cotton, cotton blends, linen, velvet, chenille, chiffon, damask, jersey, satin, silk, and combinations thereof.

12. The desk pad according to claim 1, wherein the first layer comprises a channel that spans partially or wholly around the perimeter of the first layer, and wherein the plurality of lamps are located within the channel.

13. The desk pad according to claim 1, wherein the first layer is made from a transparent material.

14. The desk pad according to claim 1, wherein the plurality of lamps are connected in series, and wherein the plurality of lamps emit white light or colored light.

15. The desk pad according to claim 1, wherein the plurality of lamps are light-emitting diode lamps.

16. The desk pad according to claim 1, further comprising a control unit, and wherein the control unit comprises one or more connection sockets that are electrically coupled to the control unit, and wherein at least one of the one or more connection sockets is a universal serial bus socket.

17. The desk pad according to claim 1, further comprising one or more layers located between the first layer and the second layer.

18. A desk pad comprising:
    a base, wherein the base comprises a first layer and a second layer, wherein the base has a perimeter defined by 4 sides;
    a plurality of lamps that emit light, wherein the plurality of lamps partially or wholly span a length of at least one of the 4 sides of the perimeter of the first layer; and
    a fabric top that is removably attached to a top side of the base, wherein a bottom side of the fabric top comprises a plurality of snap caps and studs, wherein a top side of the first layer comprises a plurality of snap sockets, and wherein the fabric top is configured to be removably attached to the top side of the first layer via the plurality of snap caps and studs and the plurality of snap sockets.

19. A desk pad comprising:
    a base, wherein the base comprises a first layer and a second layer, wherein the base has a perimeter defined by 4 sides;

a plurality of lamps that emit light, wherein the plurality of lamps partially or wholly span a length of at least one of the 4 sides of the perimeter of the first layer; and a fabric top that is removably attached to a top side of the base, wherein a bottom side of the fabric top comprises a plurality of hooks, wherein a top side of the first layer comprises a plurality of tiny eyes, and wherein the fabric top is configured to be removably attached to the top side of the first layer via the plurality of hooks and the plurality of tiny eyes.

* * * * *